US008355558B2

(12) United States Patent
Matsuura et al.

(10) Patent No.: US 8,355,558 B2
(45) Date of Patent: Jan. 15, 2013

(54) MONEY HANDLING SYSTEM

(75) Inventors: Shinji Matsuura, Tokyo-To (JP); Hajime Morino, Kasukabe (JP); Osamu Ito, Kawaguchi (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 289 days.

(21) Appl. No.: 12/736,352

(22) PCT Filed: Mar. 31, 2008

(86) PCT No.: PCT/JP2008/056341
§ 371 (c)(1),
(2), (4) Date: Sep. 30, 2010

(87) PCT Pub. No.: WO2009/122501
PCT Pub. Date: Oct. 8, 2009

(65) Prior Publication Data
US 2011/0019899 A1 Jan. 27, 2011

(51) Int. Cl.
*G06K 9/00* (2006.01)

(52) U.S. Cl. ........................................................ 382/135

(58) Field of Classification Search .......... 382/135–140; 194/4–7; 209/534–537; 235/379–382; 250/200–207; 356/71–74; 902/7–10
See application file for complete search history.

(56) References Cited

FOREIGN PATENT DOCUMENTS

| | | |
|---|---|---|
| JP | 9-106465 | 4/1997 |
| JP | 2624923 | 4/1997 |

*Primary Examiner* — Atiba O Fitzpatrick
(74) *Attorney, Agent, or Firm* — Renner, Kenner, Greive, Bobak, Taylor & Weber

(57) ABSTRACT

A money handling system includes: a sort pattern setting unit 107 configured to set a sort pattern showing one or more denominations of the banknotes to be sorted into the stacking units 103; a storage unit 109 configured to store the sort pattern set by the sort pattern setting unit 107, and to store a recognition result and a count result by the recognition unit 102 on the banknotes stacked in the stacking units 103; and a control unit 108 configured to control the transport unit 105 so as to transport the banknotes respectively to the stacking units 103 and the reject unit 104, based on the recognition result by the recognition unit 102 and the sort pattern stored in the storage unit 109.

6 Claims, 8 Drawing Sheets

| SORT PATTERN DATA 109B | | |
|---|---|---|
| | DESIGNATED DENOMINATION | BATCH NUMBER |
| STACKING UNIT 103A | 1000円 | 100 |
| STACKING UNIT 103B | 5000円 | 20 |

FIG. 6

| COUNTED DATA | | |
|---|---|---|
| COUNTDATA 109C | DESIGNATED DENOMINATION | NUMBER |
| | 1000円 | 100 |
| | 5000円 | 20 |
| REJECT DATA 109D | REJECT REASON | NUMBER |
| | 2000円 | 30 |
| | 10000円 | 5 |
| | UNRECOGNIZABLE | 10 |
| | ABNORMAL TRANSPORT | 5 |

FIG. 7

SORT PATTERN DATA 109B

| | DESIGNATED DENOMINATION | BATCH NUMBER |
|---|---|---|
| STACKING UNIT 103A | 1000円 | 100 |
| STACKING UNIT 103B | 5000円 | 20 |

↓

| | DESIGNATED DENOMINATION | BATCH NUMBER |
|---|---|---|
| STACKING UNIT 103A | 2000円 | 50 |
| STACKING UNIT 103B | 10000円 | 10 |

FIG. 12

MONEY HANDLING SYSTEM

FIELD OF THE INVENTION

The present invention relates to a money handling system. In particular, the present invention relates to a money handling system configured to continuously perform deposit processes.

BACKGROUND ART

As a money handling system for performing a deposit process of banknotes, there has been conventionally known a money handling system of a plural-stacker type, with a plurality of (three to seven) stacking units, the money handling system being configured to perform a deposit process while sorting banknotes by type (e.g., by denomination). Another conventionally known money handling system is a money handling system of a single-stacker type, with one stacking unit and one reject unit, in which all the deposited banknotes of various denominations are mixed and stacked in the one stacking unit.

In a case where a deposit process is performed by the conventional money handling system of a plural-stacker type while sorting banknotes by denomination, when the number of the stacking units is larger than the number of denominations, the deposit process can be performed at a time while sorting the banknotes by denomination. On the other hand, when the number of the stacking units is smaller than the number of denominations, it is necessary to cause one of the stacking units to function as a stacking unit in which banknotes of plural mixed denominations, which could not be sorted, are stacked during a deposit process. In the latter case, both the banknotes having been sorted by denomination and the banknotes of plural mixed denominations are recognized and counted, and an added sum is displayed as a deposit sum. After an operator has confirmed the displayed sum and given an instruction for deposit acceptance, the deposit process is completed.

In the conventional money handling system of a plural-stacker type, since the banknotes of plural mixed denominations are not sorted by denomination, it is necessary that, after a deposit process mode has been set so as to perform a deposit process, a sort process mode for sorting the banknotes of plural mixed denominations by denomination is selected so as to additionally perform a sort process.

On the other hand, in the conventional money handling system of a single-stacker type, since the number of the stacking unit is only one, the following procedure is necessary in order to perform a deposit process while sorting the banknotes by denomination. Namely, one of denominations is designated, only the banknotes of the designated denomination are sent to the stacking unit, the other banknotes are sent to the reject unit, and the banknote having been sent to the reject unit are again put into a hopper. Such a series of operations are repeated for the respective denominations.

Meanwhile, as a method for designating a denomination in the money handling system of a single-stacker type, there is known a method for designating a denomination of the normal banknote that is counted first, as a denomination of the stacking unit (JP9-106465A). In this method, although a denomination is automatically designated, an efficient deposit process cannot be performed. This is because, if the initial banknote among the banknotes put into the hopper again in the second deposit process is a reject banknote of the same denomination as that has been already sorted in the first deposit process, or if the denomination of the initial banknote is that of the smallest number of banknotes, the number of the banknotes sent to the stacking unit to be deposited in the second deposit process is small, and most of the banknotes are sent to the reject unit.

That is to say, in the conventional money handling system in which the number of the stacking units is smaller than that of the denominations, it is impossible to efficiently sort the banknotes by denomination while performing the deposit process.

DISCLOSURE OF THE INVENTION

The present invention has been made in view of the above object. According to the present invention, deposit processes for a plurality of denominations can be simultaneously performed, and deposit data of banknotes which have been previously counted, and deposit data of banknotes which are again put into a hopper, can be handled as data of the same transaction.

According to a first aspect of the present invention, there is provided a money handling system comprising: an operation unit configured to receive an instruction for deposit acceptance in a deposit process; a reception unit configured to receive banknotes; a recognition unit configured to recognize the banknotes received by the reception unit; a plurality of stacking units each of which is configured to stack a normal banknote; a reject unit configured to stack a reject banknote; a transport unit configured to transport the banknotes received by the reception unit to any one of the stacking units or the reject unit; a sort pattern setting unit configured to set a sort pattern showing one or more denominations of the banknotes to be sorted into the stacking units; a storage unit configured to store the sort pattern set by the sort pattern setting unit, and to store a recognition result and a count result by the recognition unit on the banknotes stacked in the stacking units; and a control unit configured to control the transport unit so as to transport the banknotes respectively to the stacking units and the reject unit, based on the recognition result by the recognition unit and the sort pattern stored in the storage unit; wherein the control unit is configured to clear the sort pattern stored in the storage unit when there remains no banknote in the reception unit and the stacking units, and to accept, as deposit data, the recognition result and the count result stored in the storage unit when an instruction for deposit acceptance is received by the operation unit.

In the present invention, it is preferable that after there remains no banknote in the reception unit and the stacking units, the sort pattern setting unit is configured to set another sort pattern according to which a banknote, whose denomination has not been shown in the sort pattern that has-been stored in the storage unit before there remains no banknote in the reception unit and the stacking units, is transported to one of the stacking units.

In the present invention, it is preferable that after there remains no banknote in the reception unit and the stacking units, the sort pattern setting unit is configured to write, in the storage unit, a sort pattern such that the banknotes are transported to any one of the stacking units in descending order by the number of the banknotes by denomination, among the banknotes having been transported to the reject unit.

In the present invention, it is preferable that the control unit is configured to control the transport unit so as to transport the banknotes of the denomination shown in the sort pattern stored in the storage unit respectively to the stacking units, and so as to transport the banknotes of the denomination not shown in the sort pattern stored in the storage unit to the reject unit.

According to a second aspect of the present invention, there is provided a money handling system comprising: an operation unit configured to receive an instruction for deposit acceptance in a deposit process; a reception unit configured to receive banknotes; a recognition unit configured to recognize the banknotes received by the reception unit; a stacking unit configured to stack a normal banknote; a reject unit configured to stack a reject banknote; a transport unit configured to transport the banknotes received by the reception unit to the stacking unit or the reject unit; a sort pattern setting unit configured to set a sort pattern showing one or more denominations of the banknotes to be sorted into the stacking unit or the reject unit; a storage unit configured to store the sort pattern set by the sort pattern setting unit, and to store a recognition result and a count result by the recognition unit on the banknotes stacked in the stacking unit; and a control unit configured to control the transport unit so as to transport the banknotes respectively to stacking units or the reject unit, based on the recognition result by the recognition unit and the sort pattern stored in the storage unit; wherein, after there remains no banknote in the reception unit and the stacking unit, the sort pattern setting unit is configured to set another sort pattern according to which a banknote, whose denomination has not been shown in the sort pattern that has been stored in the storage unit before there remains no banknote in the reception unit and the stacking unit, is transported to the stacking unit.

In the present invention, it is preferable that after there remains no banknote in the reception unit and the stacking units, the sort pattern setting unit is configured to write, in the storage unit, a sort pattern according to which banknotes of a denomination having been transported to the reject unit are transported to one of the stacking units, the denomination being the same as the denomination of the largest number of banknotes having been transported to the reject unit.

BRIEF DESCRIPTION OF THE DRAWINGS

FIG. 6 is a schematic view schematically showing sort pattern data 109B in the embodiment 1 according to the present invention;

FIG. 7 is a schematic view schematically showing count data 109C and reject data 109D in the embodiment 1 according to the present invention;

FIG. 12 is a conceptual view showing the sort pattern data 109B set in the sort pattern setting process (FIGS. 8 to 10) in the embodiment 1 according to the present invention.

BEST MODE FOR CARRYING OUT THE INVENTION

An embodiment of the present invention will be described herebelow with reference to the drawings. The following embodiment is one example of the present invention, and does not limit the scope of the present invention.

Embodiment 1

The embodiment 1 according to the present invention is described at first. The embodiment 1 according to the present invention is an example of a money handling system including a plurality of stacking units, in which sort pattern data are cleared between deposit processes that are continuously performed plural times.

Figure 1:
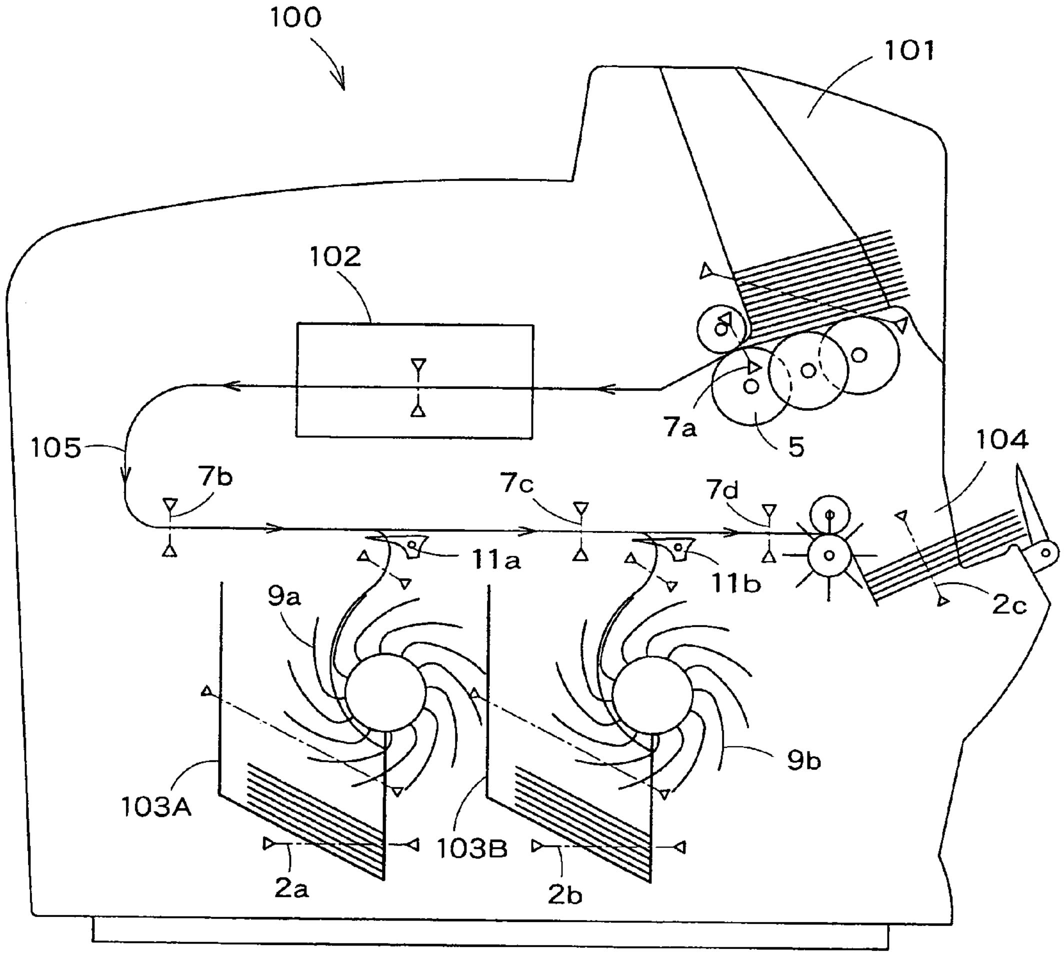
FIG. 1 is a schematic view showing an inside structure of a money handling system 100 in an embodiment 1 according to the present invention.
Figure 2:
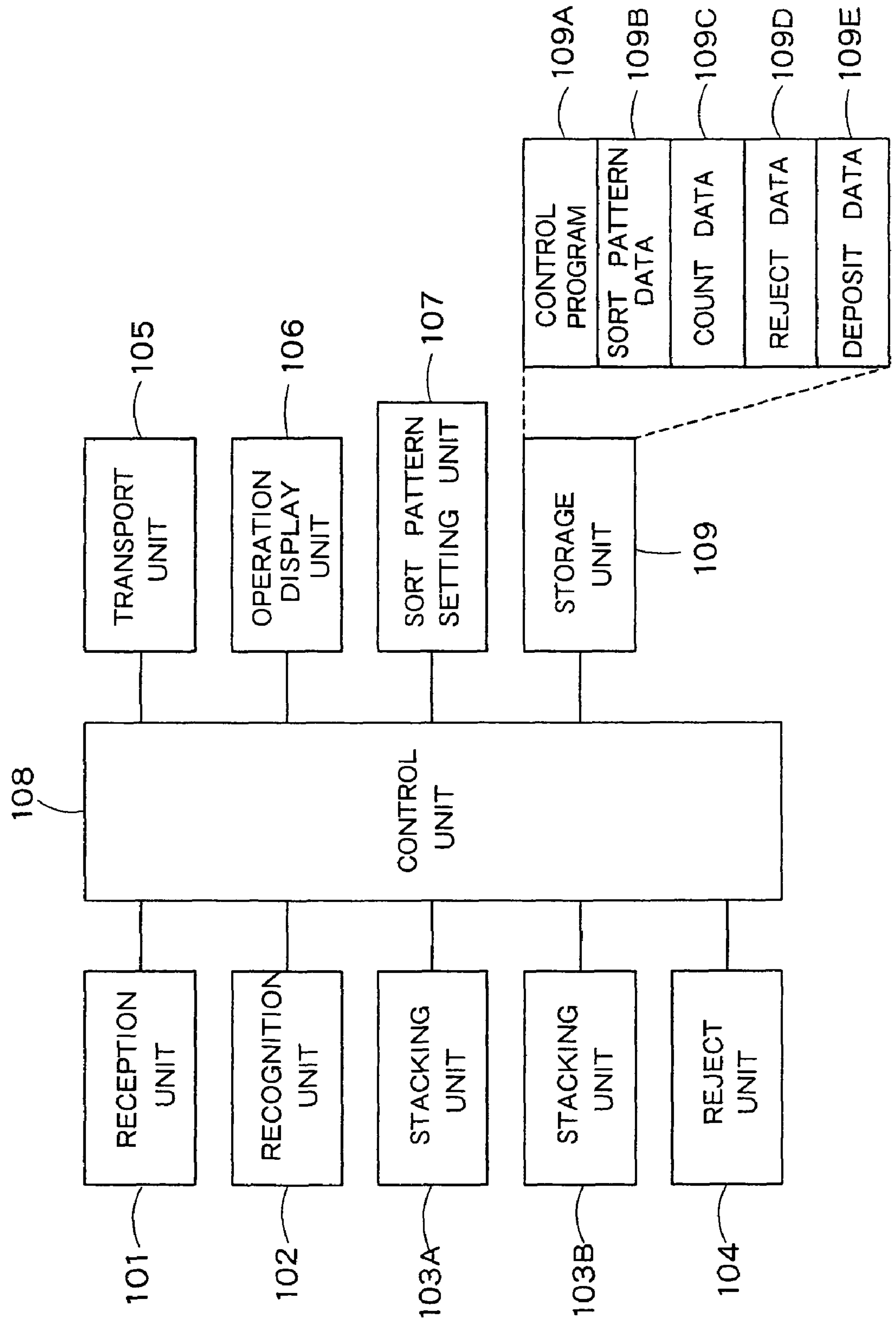
FIG. 2 is a block diagram showing a control block of the money handling system 100 in the embodiment 1 according to the present invention.

The structure of the money handling system 100 in the embodiment 1 according to the present invention is described with reference to FIGS. 1 and 2. FIG. 1 is a schematic view showing an inside structure of the money handling system 100 in the embodiment 1 according to the present invention. FIG. 2 is a block diagram showing a control block of the money handling system 100 in the embodiment 1 according to the present invention.

As shown in FIG. 1, the money handling system 100 includes a reception unit 101, a recognition unit 102, stacking units 103A and 103B, a reject unit 104, and a transport unit 105. As shown in FIG. 2, the money handling system 100 further includes an operation display unit 106, a sort pattern setting unit 107, a control unit 108, and a storage unit 109.

The reception unit 101 is configured to feed banknotes placed thereinto into the money handling system 100.

The recognition unit 102 is configured to recognize denominations of the banknotes fed by the reception unit 101, to count the number of the banknotes based on the recognition result, and to write the count result as count data 109C in the storage unit 109. The recognition unit 102 is configured to send the recognition result to the control unit 108. The recognition result includes denominations of the banknotes, and unrecognizableness thereof or abnormal transport thereof (skew, chain or overlap).

The stacking units 103A and 103B are configured to stack banknotes that have been judged by the control unit 108 as banknotes to be transported to the stacking units 103A and 103B (hereinafter referred to as "normal banknotes").

The reject unit 104 is configured to stack banknotes that have been judged by the control unit 108 as banknotes to be transported to the reject unit 104 (hereinafter referred to as "reject banknotes").

The transport unit 105 is configured to transport the banknotes fed by the reception unit 101 to the recognition unit 102, and to transport the banknotes to the stacking units 103A, 103B or the reject unit 104, based on the control of the control unit 108.

The operation display unit 106 includes an instruction reception mechanism and a display mechanism, which are not shown. The instruction reception mechanism is a keyboard for receiving an instruction of an operator. The display mechanism is a display for displaying predetermined information to the operator.

The sort pattern setting unit 107 is configured to set a pattern (hereinafter referred to as "sort pattern") of denominations of the banknotes to be sorted and stacked in the stacking units 103A and 103B, and to write the pattern as sort pattern data 109B in the storage unit 109.

The control unit 108 is connected to the respective units 101 to 107 and 109. The control unit 108 is configured to activate a control program 109A stored in the storage unit 109, so as to control the respective units 101 to 107 of the money handling system 100. Based on the recognition result of the recognition unit 102 and the sort pattern, the control unit 108 is configured to judge whether a banknote fed by the reception unit 101 is a banknote to be transported to the stacking unit 103A or 103B (normal banknotes), or a banknote to be transported to the reject unit 104 (reject banknotes). The control unit 108 is configured to control the transport unit 105 such that the banknotes judged as the normal banknotes are transported to the stacking unit 103A or 103B for each denomination, and that the banknotes judged as the reject banknotes are transported to the reject unit 104. When the banknotes are judged as the reject banknotes, the control unit 108 is configured to write reject data 109D including denominations of the reject banknotes and reject reasons, in the storage unit 109.

The storage unit 109 stores the control program 109A, the sort pattern data 109B, the count data 109C, the reject data 109D, and deposit data 109E. The control unit 109 also functions as a working memory of the control unit 108.

Next, an operation of the money handling system 100 in the embodiment 1 according to the present invention is described with reference to FIG. 1.

As shown in FIG. 1, the banknotes placed into the reception unit 101 are taken one by one into the money handling system 100 by rotation of a feeding roller 5. The taken banknotes pass through the recognition unit 102. At this time, denominations of the banknotes are recognized at a predetermined timing from a time point of detection by a tracking sensor 7*a*. The banknotes having passed through the recognition unit 102 are transported to the staking units 103A, 103B or the reject unit 104 via branch levers 11*a* and 11*b*. At this time, the branch levers 11*a* and 11*b* are driven by a solenoid (not shown) at a predetermined timing from a time point of detection of tracking sensors 7*b* to 7*d*. The banknotes judged as normal banknotes are diverted so as to be transported to the stacking units 103A and 103B via stacking wheels 9*a* and 9*b*. The banknotes judged as reject banknotes are transported to the reject unit 104 without being diverted. Remaining conditions of the banknotes stacked in the stacking units 103A, 103B or the reject unit 104 are detected by remaining-condition detection sensors 2*a* to 2*c*. The respective components are driven by a motor.

In the embodiment 1 according to the present invention, the money handling system 100 including the two stacking units 103A and 103B is taken by way of example. However, the number of the stacking unit(s) 103 may be one or more.

Figure 3:
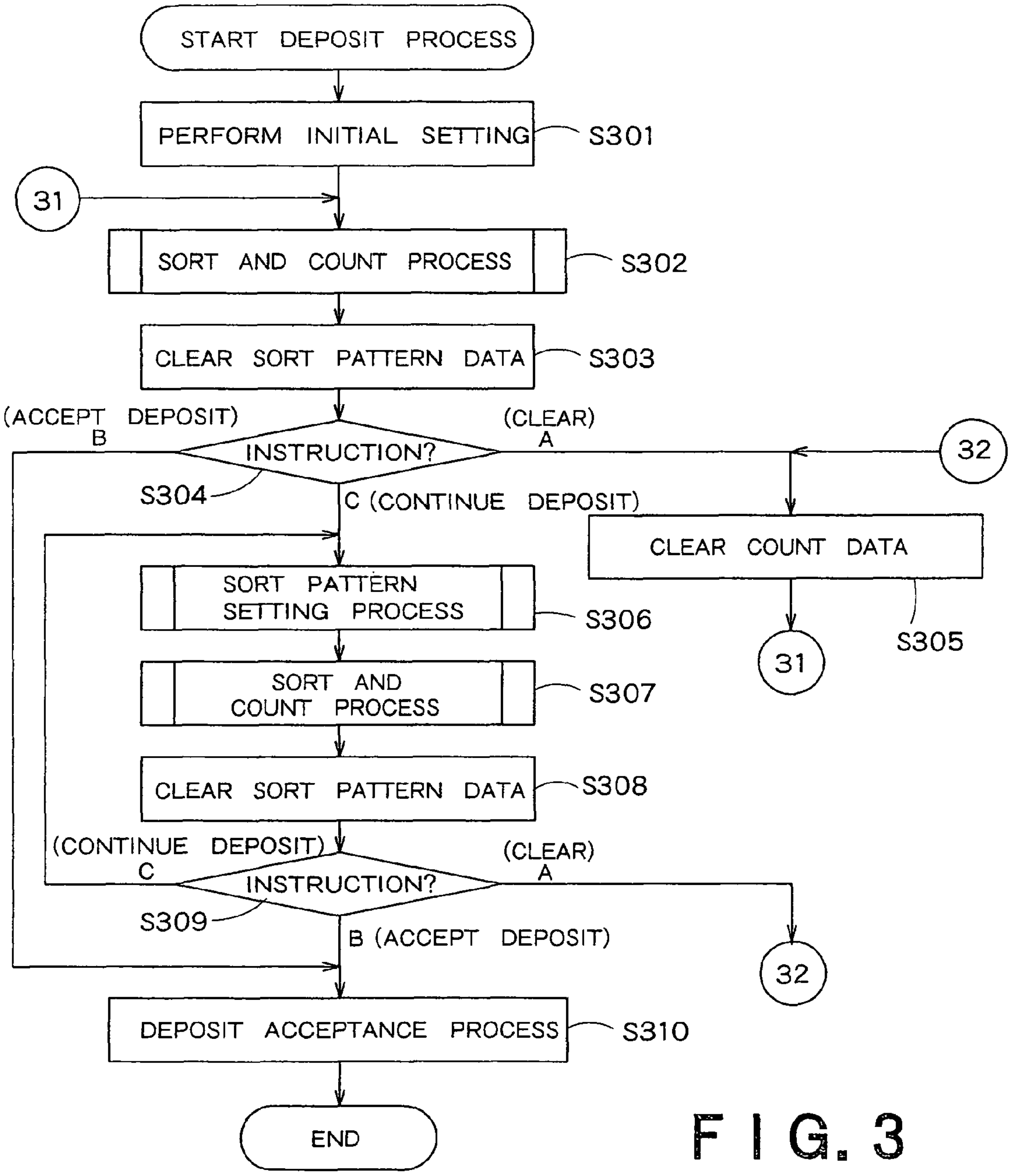
FIG. 3 is a flowchart showing a process procedure of a deposit process in the embodiment 1 according to the present invention.

Next, process contents of the money handling system 100 in the embodiment 1 according to the present invention are described with reference to FIGS. 3 to 12. FIG. 3 is a flowchart showing a process procedure of a deposit process in the embodiment 1 according to the present invention.

At first, an initial setting is performed by an operator (S301). In the initial setting, a sort pattern data 109B to be referred to in the below-described sort and count process (S302) is selected, a reject data mode/a count data mode in the below-described sort pattern setting process (S306) is selected, and the count data 109C stored in the storage unit 109 are initialized.

Then, the below-described sort and count process (FIG. 5) is performed (S302).

Then, the sort pattern data 109B having been referred to in the step S302 are cleared (S303). At this time, as shown in FIG. 4, a confirmation image, which includes a clear key 106A, a deposit acceptance key 106B and a continuous deposit key 106C, is displayed on the operation display unit 106.

Figure 4:
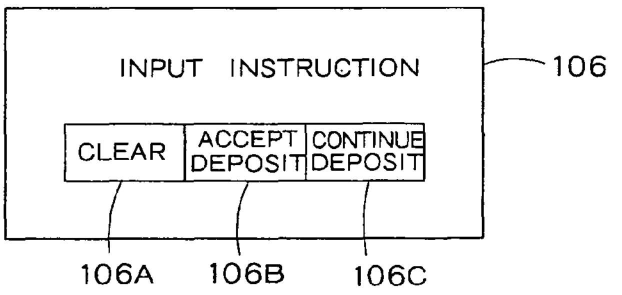
FIG. 4 is a schematic view schematically showing a confirmation image displayed on an operation display unit 106 in the embodiment 1 according to the present invention.

When the clear key 106A shown in FIG. 4 is selected (S304-A), the count data 109C that have been stored in the storage unit 109 are cleared, and the program returns to the step S302 (S305).

When the deposit acceptance key 106B shown in FIG. 4 is selected (S304-B), a deposit acceptance process is performed (S310), in which the count data 109C that have been stored in the storage unit 109 are added to the deposit data 109E, and thereafter the count data 109C are cleared.

When the continuous deposit key 106C is selected (S304-C), the below-described sort pattern setting process (FIGS. 8 and 10) is performed (S306).

Then, the below-described sort and count process (FIG. 5) is performed (S307).

Then, the sort pattern data 109B having been referred to in the step S307 are cleared (S308). At this time, as shown in FIG. 4, the confirmation image including the clear key 106A, the deposit acceptance key 106B and the continuous deposit key 106C is displayed on the operation display unit 106.

When the clear key 106A shown in FIG. 4 is selected (S309-A), the program proceeds to the step S305.

When the deposit acceptance key 106B shown in FIG. 4 is selected (S309-B), the deposit acceptance process is performed (S310), in which the count data 109C that have been stored in the storage unit 109 are added to the deposit data 109E, and thereafter the count data 109C are cleared.

When the continuous deposit key 106C shown in FIG. 4 is selected (S309-C), the program returns to, the step S306.

The deposit process in the embodiment 1 according to the present invention is finished after the step S310.

In the embodiment 1 according to the present invention, instead of the case in which the continuous deposit key 106C is selected in the step S304, an instruction for continuing the deposit process may be received based on the fact that banknotes are placed into the reception unit 101.

Figure 5:
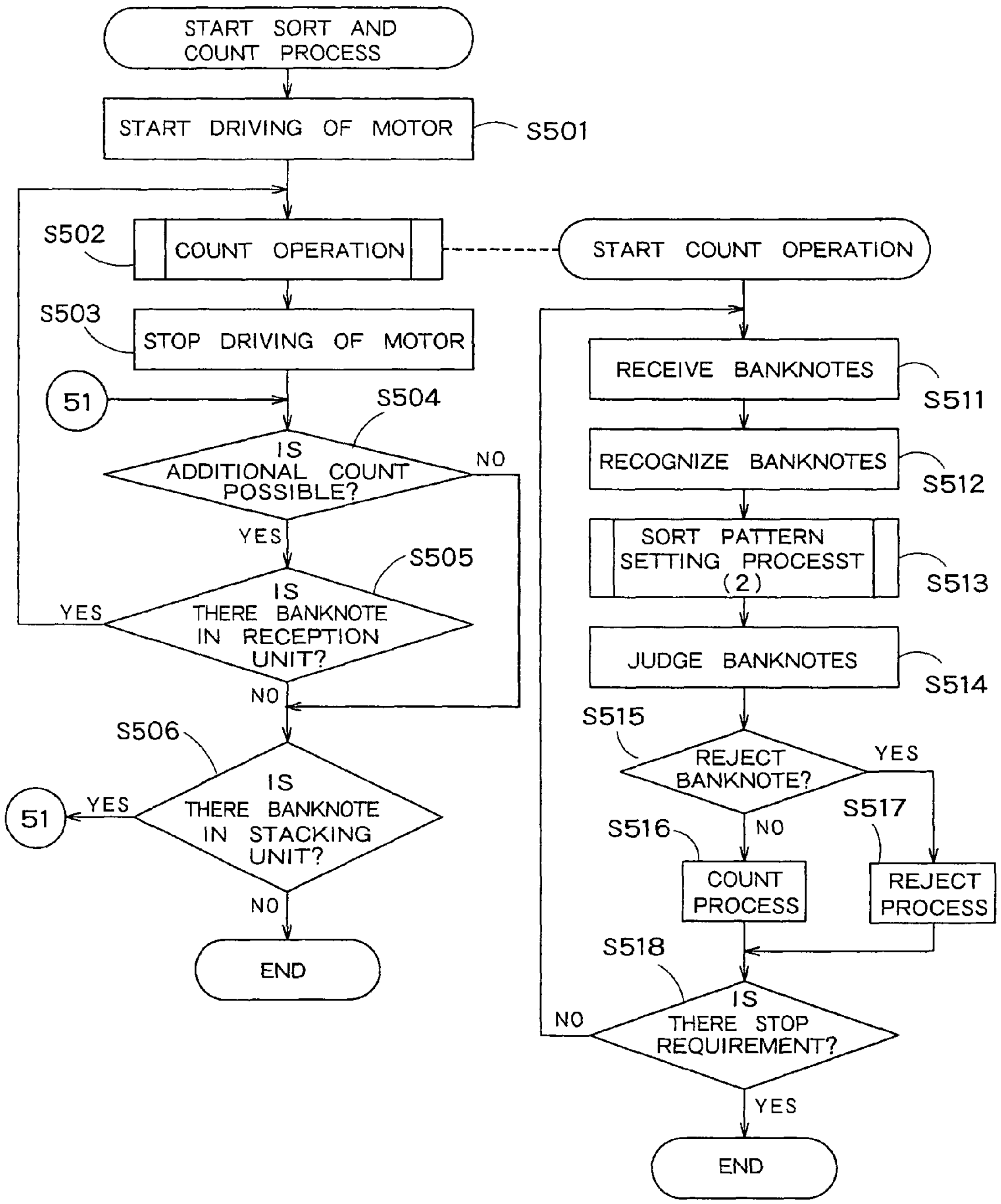
FIG. 5 is a flowchart showing a process procedure of a sort and count process (S302 and S307 in FIG. 3) in the embodiment 1 according to the present invention.

FIG. 5 is a flowchart showing a process procedure of the sort and count process (S302 and S307 in FIG. 3) in the embodiment 1 according to the present invention. The sort and count process in the embodiment 1 according to the present invention is a process performed after banknotes have been placed into the reception unit 101.

At first, driving of the motor for operating the respective units 101 to 107 is started by the control unit 108 (S501).

Then, a count operation is performed (S502).

In the count operation in the step S502, the banknotes placed into the reception unit 101 are firstly fed into the money handling system 100 by the reception unit 101 (S511).

Then, denominations of the banknotes received in the step S511 are recognized (S512). At this time, the recognition result is sent to the control unit 108.

Then, the following sort pattern setting process (2) (FIG. 9) is performed (S513).

Then, based on the recognition result obtained in the step S512 and the sort pattern, whether the banknote is a normal banknote or a reject banknote is judged (S514). For example, when no reject reason is included in the recognition result obtained in the step S512, the banknote is judged as a normal banknote. On the other hand, when a reject reason is included, the banknote is judged as a reject banknote. The reject reason includes an unrecognizableness, an abnormal transport or a non-designated denomination (denomination that is not shown in the sort pattern data 109B).

When the banknote is judged as the normal banknote in the step S514 (S515-NO), the count process is performed (S516). FIG. 6 shows a sort pattern data 109B according to which one hundred 1000-yen banknotes and twenty 5000-yen banknotes are sorted. In the count process, based on the recognized denominations, the number of the banknotes for each denomination of the count data 109C are added. Then, based on the sort pattern data 109B, the banknotes judged as normal banknotes are transported to the stacking units 103A or 103B.

On the other hand, when the banknote is judged as a reject banknote (S515-YES), a reject process is performed (S517). In the reject process, the reject data 109D are updated for each reject reason, and the banknotes judged as reject banknotes are transported to the reject unit 104.

The steps S511 to 517 are repeated until a stop requirement occurs (S518-NO). The stop requirement occurs, when all the banknotes put into the reception unit 101 are received, when the numbers of the banknotes stacked in the stacking units 103A and 103B reach a batch number or a maximum stack number shown in the sort pattern data 109B, or when a stop instruction is received by the operation display unit 106. By repeating the steps S511 to S517, counted data, as shown in FIG. 7, including the count data 109C and the reject data 109D, are written in the storage unit 109.

When the stop requirement occurs (S518-YES), the count operation is finished.

When the count operation is finished, the driving of the motor for operating the respective units 101 to 107 is stopped by the control unit 108 (S503).

When an additional count is possible (S504-YES) and there are banknotes in the reception unit 101 (S505-YES), the program returns to the step S502. The additional count is possible when the condition, in which the numbers of the banknotes stacked in the stacking units 103A or 103B reach the batch number or the maximum stack number shown in the sort pattern data 109B, is resolved.

When the additional count is impossible (S504-NO) or when there is no banknote in the reception unit 101, and when there are banknotes in the stacking units 103A or 103B (S506-YES), the program returns to the step S504.

On the other hand, when the additional count is impossible (S504-NO) or when there is no banknote in the reception unit 101, and when there is no banknote in the stacking units 103A and 103B (for example, after the banknotes stacked in the stacking units 103A and 103B have been removed therefrom) (S506-NO), the sort and count process in the embodiment 1 according to the present invention is finished.

Figure 8:
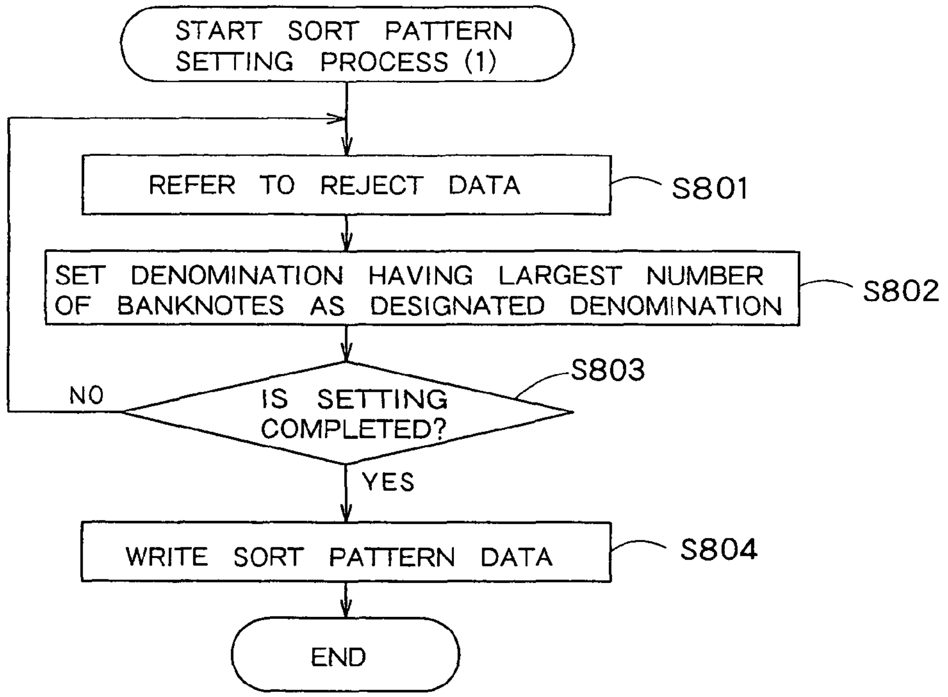
FIG. 8 is a flowchart showing a first example of a sort pattern setting process (S306 in FIG. 3) in the embodiment 1 according to the present invention.

FIG. 8 is a flowchart showing a first example of a sort pattern setting process (S306 in FIG. 3) in the embodiment 1 according to the present invention.

At first, the reject data 109D stored in the storage unit 109 are referred to (S801).

Then, the denomination having the largest number of banknotes in the reject data 109D, which have been referred to in the step S801, is set as a designated denomination of the sort pattern (S802).

The steps S801 and S802 are repeated until a setting is completed (S803-NO). The setting is completed, when the sort patterns are set for all the stacking units 103A and 103B.

When the setting of the sort patterns is completed (S803-YES), sort pattern data 109B reflecting the process results of the steps S801 and S802 are written in the storage unit 109, and the first example of the sort pattern setting process in the embodiment 1 according to the present invention is finished (S804).

Figure 9:
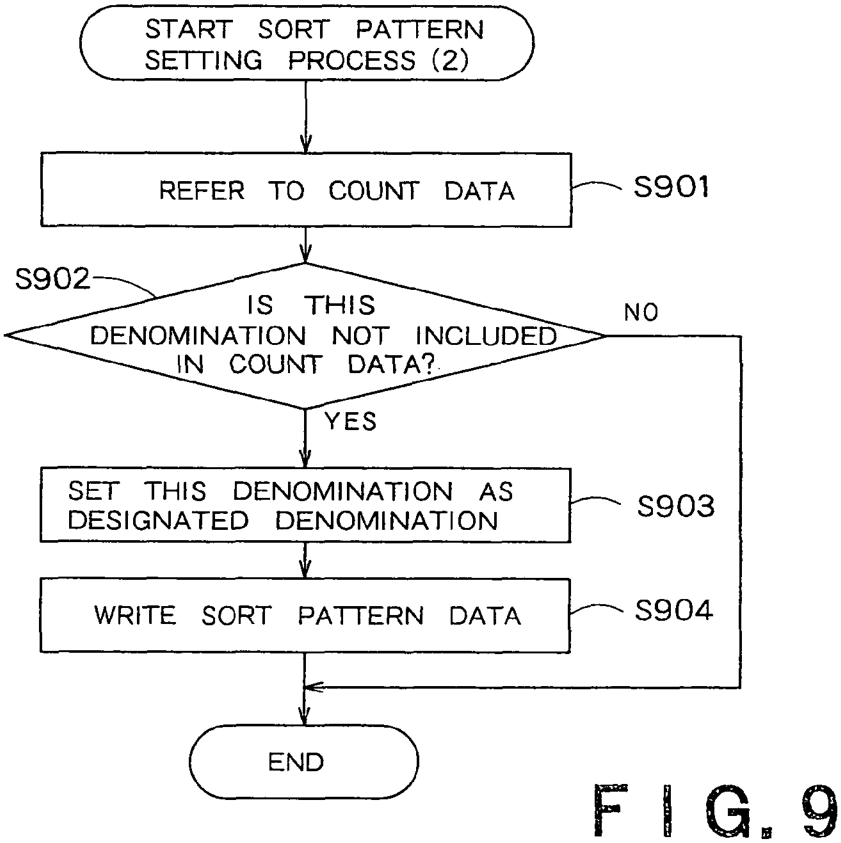
FIG. 9 is a flowchart showing a second example of the sort pattern setting process (S513 in FIG. 5) in the embodiment 1 according to the present invention.

FIG. 9 is a flowchart showing a second example of the sort pattern setting process (S513 in FIG. 5) in the embodiment 1 according to the present invention.

At first, the count data 109C stored in the storage unit 109 are referred to (S901).

When the denomination recognized in the step S512 shown in FIG. 5 is a denomination that does not exist in the count data 109C which have been referred to in the step S901 (S902-YES), the denomination is set as a designated denomination of the sort pattern (S903).

Then, sort pattern data 109B reflecting the process results of the steps S901 to S903 are written in the storage unit 109 (S904).

The second example of the sort pattern setting process in the embodiment 1 according to the present invention is finished, when the denomination recognized in the step S512 shown in FIG. 5 is a denomination that exists in the count data 109C which have been referred to in the step S901 (S902-NO), or after the step S904.

Figure 10:
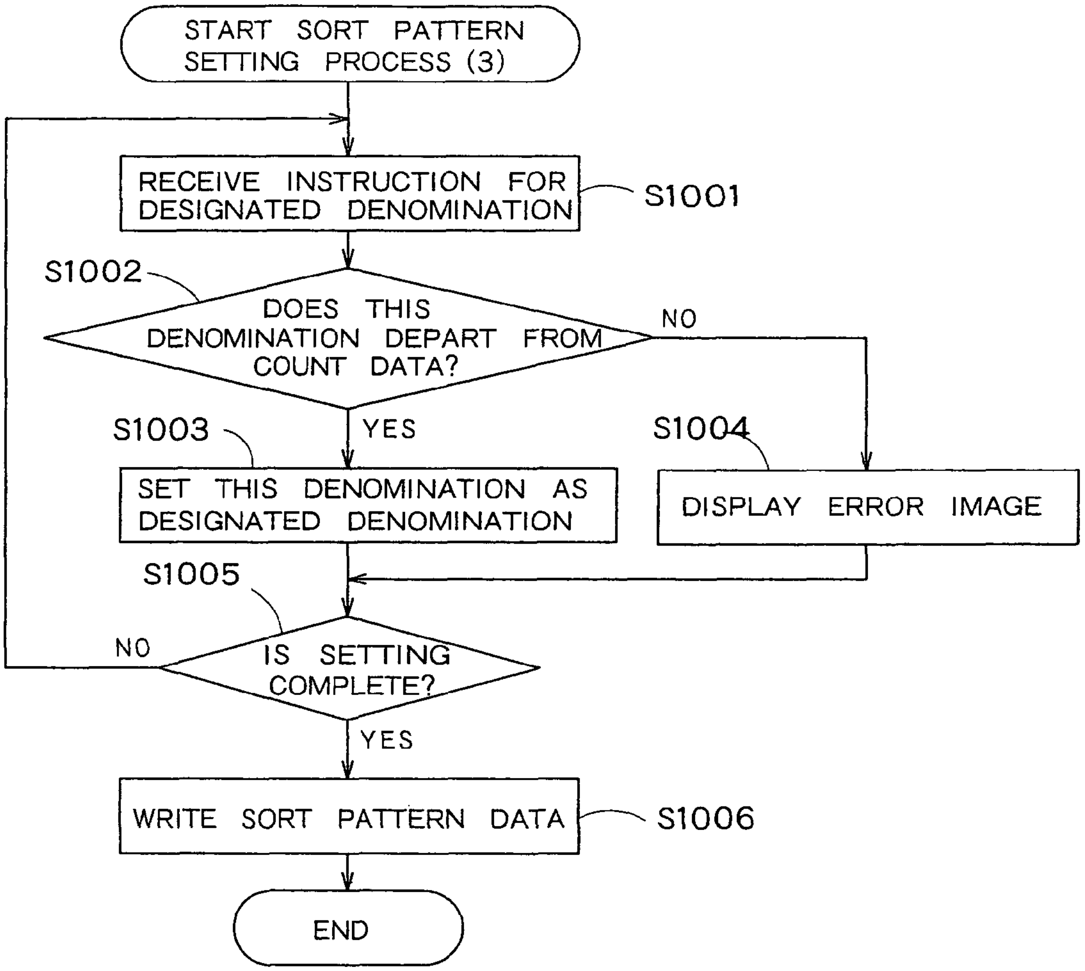
FIG. 10 is a flowchart showing a third example of the sort pattern setting process (S306 in FIG. 3) in the embodiment 1 according to the present invention.

FIG. 10 is a flowchart showing a third example of the sort pattern setting process (S306 in FIG. 3) in the embodiment 1 according to the present invention.

At first, an instruction for a designated denomination of the sort pattern is received by the operation display unit 106 (S1001).

When the denomination having been received in the step S1001 is a denomination that does not exist in the count data 109C stored in the storage unit 109 (S1002-YES), the denomination is set as the designated denomination of the sort pattern (S1003).

Figure 11:
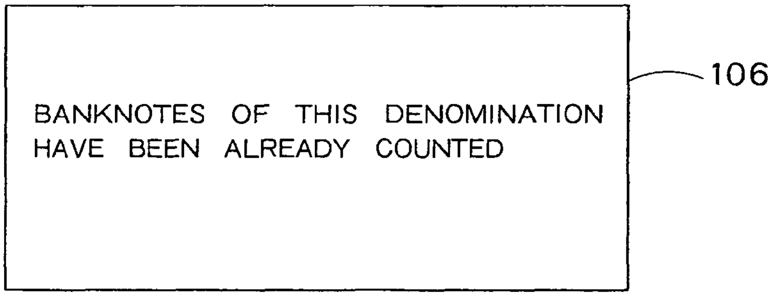
FIG. 11 is a schematic view schematically showing an error image displayed on the operation display unit 106 in the embodiment 1 according to the present invention.

On the other hand, when the denomination having been received in the step S1001 is a denomination that exits in the count data 109C stored in the storage unit 109 (S1002-NO), an error image as shown in FIG. 11 is displayed on the operation display unit 106 (S1004).

The steps S1001 to S1004 are repeated until a setting is completed (S1005-NO). The setting is completed when the sort patterns are set for all the stacking units 103A and 103B.

When the setting of the sort patterns is completed (S1005-YES), sort pattern data 109B reflecting the process results of the steps S1001 to S1004 are written in the storage unit 109, and the third example of the sort pattern setting process in the embodiment 1 according to the present invention is finished (S1006).

FIG. 12 is a conceptual view showing sort pattern data 109B set in the sort pattern setting processes (FIGS. 8 to 10) in the embodiment 1 according to the present invention.

According to the sort pattern setting processes shown in FIGS. 8 to 10, in the deposit process, denominations (2000-yen and 10000-yen) that do not exist in the sort pattern data 109B referred to in the first sort and count process (S302 in FIG. 3), are written in the storage unit 109 as sort pattern data 109B to be referred to in the second sort and count process (S307 in FIG. 3).

According to the embodiment 1 according to the present invention, the sort pattern data 109B are cleared between the plurality of sort and count processes, and new sort patterns are set such that a different denomination is designated for each sort and count process. Thus, even in the money handling system in which the number of the stacking units is smaller than the number of denominations, the banknotes can be efficiently sorted by denomination in the deposit process.

In addition, according to the embodiment 1 of the present invention, the sort pattern is set based on the count data 109C or the reject data 109D, so that a load on an operation for setting sort patterns can be reduced, when the plurality of sort and count processes are performed.

The invention claimed is:

1. A money handling system comprising:

an operation unit configured to receive an instruction for deposit acceptance in a deposit process;

a reception unit configured to receive banknotes;

a recognition unit configured to recognize the banknotes received by the reception unit;

a plurality of stacking units each of which is configured to stack a normal banknote;

a reject unit configured to stack a reject banknote;

a transport unit configured to transport the banknotes received by the reception unit to any one of the stacking units or the reject unit;

a sort pattern setting unit configured to set a sort pattern showing one or more denominations of the banknotes to be sorted into the stacking units;

a storage unit configured to store the sort pattern set by the sort pattern setting unit, and to store a recognition result and a count result by the recognition unit on the banknotes stacked in the stacking units; and a control unit configured to control the transport unit so as to transport the banknotes respectively to the stacking units and the reject unit, based on the recognition result by the recognition unit and the sort pattern stored in the storage unit;

wherein the control unit is configured to clear the sort pattern stored in the storage unit when there remains no banknote in the reception unit and the stacking units, and to accept, as deposit data, the recognition result and the count result stored in the storage unit when an instruction for deposit acceptance is received by the operation unit.

2. The money handling system according to claim 1, wherein after there remains no banknote in the reception unit and the stacking units, the sort pattern setting unit is configured to set another sort pattern according to which a banknote, whose denomination has not been shown in the sort pattern that has been stored in the storage unit before there remains no banknote in the reception unit and the stacking units, is transported to one of the stacking units.

3. The money handling system according to claim 1, wherein after there remains no banknote in the reception unit and the stacking units, the sort pattern setting unit is configured to write, in the storage unit, a sort pattern such that the banknotes are transported to any one of the stacking units in descending order by the number of the banknotes by denomination, among the banknotes having been transported to the reject unit.

4. The money handling system according to claim 1, wherein the control unit is configured to control the transport unit so as to transport the banknotes of the denomination shown in the sort pattern stored in the storage unit respectively to the stacking units, and so as to transport the banknotes of the denomination not shown in the sort pattern stored in the storage unit to the reject unit.

5. A money handling system comprising:

an operation unit configured to receive an instruction for deposit acceptance in a deposit process;

a reception unit configured to receive banknotes;

a recognition unit configured to recognize the banknotes received by the reception unit;

a stacking unit configured to stack a normal banknote;

a reject unit configured to stack a reject banknote;

a transport unit configured to transport the banknotes received by the reception unit to the stacking unit or the reject unit;

a sort pattern setting unit configured to set a sort pattern showing one or more denominations of the banknotes to be sorted into the stacking unit or the reject unit;

a storage unit configured to store the sort pattern set by the sort pattern setting unit, and to store a recognition result and a count result by the recognition unit on the banknotes stacked in the stacking unit; and a control unit configured to control the transport unit so as to transport the banknotes respectively to stacking units or the reject unit, based on the recognition result by the recognition unit and the sort pattern stored in the storage unit;

wherein, after there remains no banknote in the reception unit and the stacking unit, the sort pattern setting unit is configured to set another sort pattern according to which a banknote, whose denomination has not been shown in the sort pattern that has been stored in the storage unit before there remains no banknote in the reception unit and the stacking unit, is transported to the stacking unit.

6. The money handling system according to claim 5, wherein, after there remains no banknote in the reception unit and the stacking units, the sort pattern setting unit is configured to write, in the storage unit, a sort pattern according to which banknotes of a denomination having been transported to the reject unit are transported to one of the stacking units, the denomination being the same as the denomination of the largest number of banknotes having been transported to the reject unit.

* * * * *